A. MERČAK.
SOLDERING IRON.
APPLICATION FILED MAR. 25, 1918.
1,273,518.
Patented July 23, 1918.
2 SHEETS—SHEET 2.
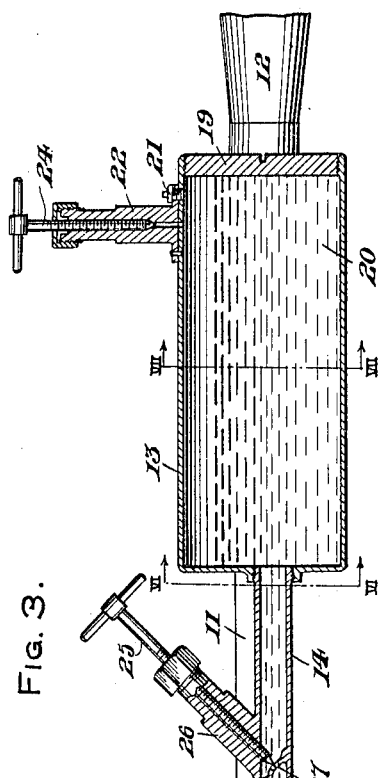
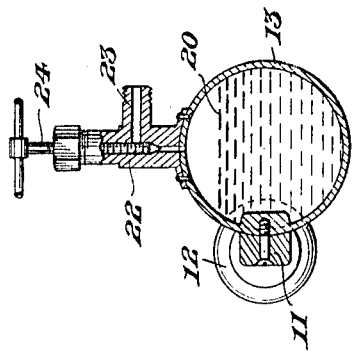
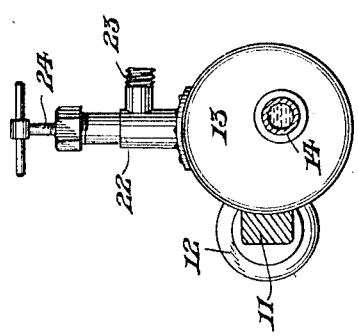
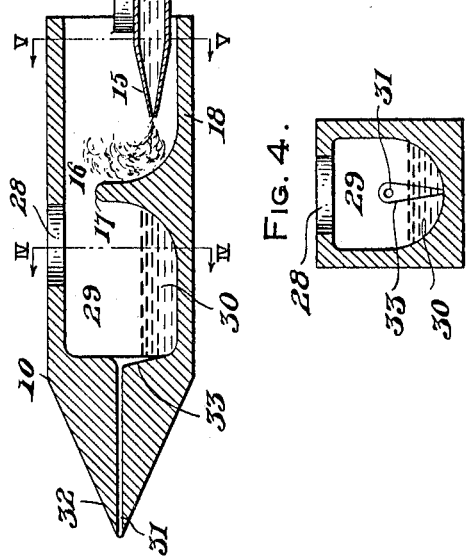
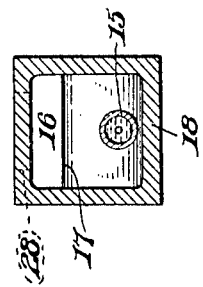
Inventor
A. Merčak
By N. M. Wilson
Attorney

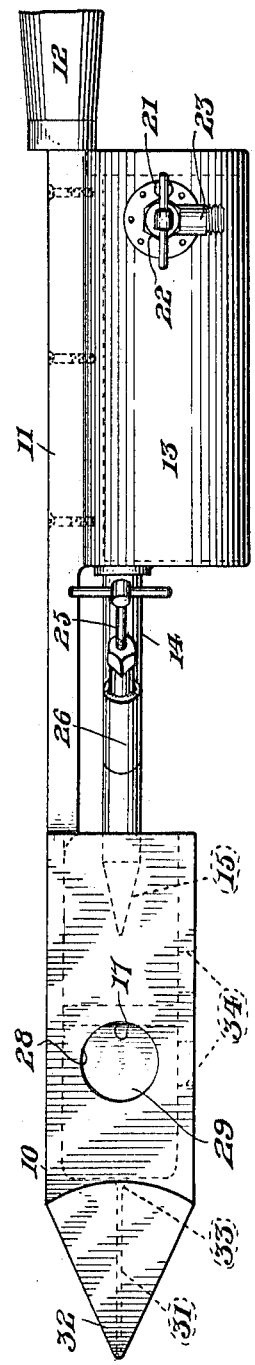

UNITED STATES PATENT OFFICE.

ANDREW MERČAK, OF EAST DOUGLASS, MASSACHUSETTS.

SOLDERING-IRON.

1,273,518.  Specification of Letters Patent.  Patented July 23, 1918.

Application filed March 25, 1918. Serial No. 224,523.

*To all whom it may concern:*

Be it known that I, ANDREW MERČAK, a subject of the King of Hungary, residing at East Douglass, in the county of Worcester and State of Massachusetts, have invented certain new and useful Improvements in Soldering-Irons, of which the following is a specification.

The primary object of the invention is the provision of a soldering iron arranged with contained heating means in the form of a gasolene burner and whereby the tool may be employed for soldering purposes and uniformly heated to a degree that is readily regulated by the operator.

A further object of the invention is the provision of a gasolene soldering iron arranged for rapidly heating the soldering member to the desired temperature and maintaining the same at such temperature during the employment of the tool, the structure possessing great strength as well as simplicity.

A still further object of the invention is to provide a self-heating soldering iron that is easy and inexpensive to manufacture and arranged for easy operation in controlling the heating means, the device being readily portable.

In the drawings forming a part of this application and in which like designating characters refer to corresponding parts throughout the several views, Figure 1 is a top plan view of the device with the handle broken away.

Fig. 2 is a side elevation thereof.

Fig. 3 is a central longitudinal sectional view of the same, and

Figs. 4, 5, 6, and 7 are transverse sectional views taken of the device substantially upon lines IV—IV, V—V, VI—VI, and VII—VII respectively of Fig. 3.

It being understood that the device consists of a self-heating soldering iron, the same broadly consists of a contact point or block 10 having a shank 11 with a holding handle 12 while a gasolene pressure tank 13 is secured to the said shank with conducting pipe 14 terminating in a nozzle 15 within the chamber 16 of the block 10.

The said block 10 being arranged with the internal chamber 16 has a substantially centrally positioned baffle plate 17 upwardly projecting from the bottom wall 18 of the chamber 16 with the nozzle 15 terminating adjacent the rear wall of the baffle plate 17 for engaging additional surface for intensely heating the block 10.

The screw threaded head 19 is arranged in the rear end of the tank 13 for normally closing the same while gasolene such as 20 may be placed in the tank by removing a filling plug 21. A nipple 22 is mounted upon the tank 13 having a side boss 23 adapted to be engaged by an air pump, not shown, for forcing air into the tank 13 exerting pressure upon the gasolene 20 and forcing the gasolene through the tool or burner pipe 14. A threaded needle valve 24 is carried by the nipple 22 for closing the air inlet to the tank 13.

A needle valve 25 is arranged with a casing 26 upon the pipe 14 for controlling the passage of gasolene through a valve opening 27 in the pipe 14. It will be understood that by placing gasolene in the tank 13 and forcing air into the tank above the gasolene that suitable pressure will be obtained for forcing the gasolene to the nozzle 15 under the control of the needle valve 25 so that the gasolene escaping within the block chamber 16 may be readily lighted through a top opening 28 in the block 10.

The forward portion of the chamber 16 is in the form of a crucible 29 for containing soldering metal or a flux such as 30 positioned therein through the top opening 28 and readily melted by the heat generated by the burner nozzle 15. An axial tool 31 is arranged through the forward pyramid-shaped point 32 of the block 10 having a downwardly converging groove 33 at the inner end of the tool 31 in the forward wall of the chamber 16. It will be seen that by suitably tilting the block 10, the flux 30 will flow out through the groove 33 and outlet 31 for positioning upon the work during the movement of the block 10 thereover in the soldering operation. Side openings 34 are provided in the block 28 to admit air into the chamber 16 while the rear end of the block is of open arrangement. The device is readily employed by grasping the handle 12 and moving the point 32 wherever desired, the heat for melting the flux as well as maintaining the block 10 at a high temperature being controlled by means of the needle valve 25. It will be understood that the gasolene torch is lighted in the usual manner at the nozzle 15 and that the tank 13 and burner tube 14 also operate as usually arranged.

What I claim as new is:—

1. A soldering iron comprising a pointed block having a chamber therein with an integral baffle plate providing a crucible portion within the block, a supporting means carried by the rear end of the block, a gasolene torch upon the said supporting means having a burner nozzle arranged within the chamber of the block at the opposite side of the baffle plate from the said crucible portion, the said block having an axial outlet at the forward tapered end thereof.

2. A soldering iron comprising a pointed block having a chamber therein with an integral baffle plate providing a crucible portion within the block, a supporting means carried by the rear end of the block, a gasolene torch upon the said supporting means having a burner nozzle arranged within the chamber of the block at the opposite side of the baffle plate from the said crucible portion, the said block having an axial outlet at the forward tapered end thereof, a controlling needle valve for the burner, the said block having a top entrance opening adjacent the crucible portion of the chamber and with air inlet openings at its side adjacent the opposite sides of the said baffle plate.

3. A soldering iron comprising a block having a forwardly arranged point and further having an internal chamber provided with a substantially central baffle plate dividing the chamber into an open ended outer portion and an axial outlet in its forward pointed portion and a groove leading from the said outlet into the crucible portion, the said block further having an inlet above the crucible portion and side openings at opposite sides of the baffle plate, and a gasolene torch arranged within the outer portion of the chamber.

4. A soldering iron comprising a block having a forwardly arranged point and further having an internal chamber provided with a substantially central baffle plate dividing the chamber into an open ended outer portion and an axial outlet in its forward pointed portion and a groove leading from the said outlet into the crucible portion, the said block further having an inlet above the crucible portion and side openings at opposite sides of the baffle plate, a shank carried by the rear end of the block, a holding handle upon the free end of the shank, a gasolene tank arranged upon said shank, a burner tube extending from said tank with a tapered outlet burner end within the block adjacent the outer side of said baffle plate, a controlling needle valve in the said outlet pipe, an air inlet nipple upon the tank, a needle valve for the said nipple and a removable head at the outer end of the tank.

5. A soldering iron comprising a block having a chamber therein arranged with a transverse baffle plate forming a flux receiving crucible portion within said chamber, the said block having an axial outlet from the said crucible portion in the forward tapered end of the block whereby the flux may be distributed upon the work during the operation of the device and a controllable heating burner for the block projecting into the chamber adjacent the outer side of the said baffle plate.

In testimony whereof I affix my signature.

ANDREW MERCAK.

Copies of this patent may be obtained for five cents each, by addressing the "Commissioner of Patents Washington, D. C."